United States Patent [19]
Lord

[11] 3,745,440
[45] July 10, 1973

[54] ELECTRICAL INVERTER-RECTIFIER CIRCUIT AND INDUCTOR APPARATUS THEREFOR

[75] Inventor: Harold Wilbur Lord, Mill Valley, Calif.

[73] Assignee: Litton Systems, Inc., San Carlos, Calif.

[22] Filed: Feb. 28, 1972

[21] Appl. No.: 229,819

[52] U.S. Cl............................ 321/26, 321/2, 321/47, 323/48
[51] Int. Cl. .............................................. H02m 7/00
[58] Field of Search...................... 321/2, 27 R, 47, 321/26; 323/48, 49

[56] References Cited
UNITED STATES PATENTS

| | | | |
|---|---|---|---|
| 3,363,165 | 1/1968 | Wilkinson | 321/27 R |
| 3,381,204 | 4/1968 | Cox | 321/15 |
| 3,419,786 | 12/1968 | Brane | 321/27 R |
| 3,568,035 | 3/1971 | Pierson | 323/48 X |

*Primary Examiner*—William M. Shoop, jr.
*Attorney*—Ronald M. Goldman et al.

[57] ABSTRACT

The disclosed invention converts a square wave alternating voltage of relatively low voltage to a high direct voltage and is used as part of a conventional DC to DC voltage converter such as is found in electronic inverter/rectified regulated voltage power supply systems. An input transformer contains a primary winding and a plurality of separate secondary windings, such as four in one example. Each of the secondary windings is a single layer and all have the same number of turns. The secondary windings are electrically isolated and are wound one atop the other with their positive polarity ends facing the same direction in order to derive concurrently a plurality of equal AC voltages from the transformation of a voltage applied to the primary winding. The output of each of the secondary windings is rectified in a corresponding one of a plurality of rectifiers associated with the secondary windings into a plurality of equal DC voltages. These voltages are then added together in series or "summed" to provide the desired DC output power. A capacitor network which contains a plurality of capacitors, for example four, corresponding in number to the secondary windings, connected in series and the voltages from a corresponding rectifier is coupled in additive polarity across a corresponding one of the capacitors to provide the voltage "summing". In an improvement a plurality of inductors are employed with each one of said inductors placed in series with each corresponding ones of the output leads of each rectifier assembly so as to form with the capacitors an L-C circuit and thereby minimize the ripple voltage of the output power to the load.

A novel multi-section inductor assembly having minimal distributed capacitance is utilized for said plurality of inductors and comprises a plurality of individual windings, divided into two groups each of which is insulated from one another, is of substantially equal number of turns, is of a single layer, is oriented with the windings in phase and wound upon a common nonsaturating magnetic core or lamination. Other than the first winding in one group and last winding in the second group the negative polarity ends of the winding in one group are connected electrically in common with the positive polarity ends of corresponding windings in the second group of windings.

19 Claims, 17 Drawing Figures

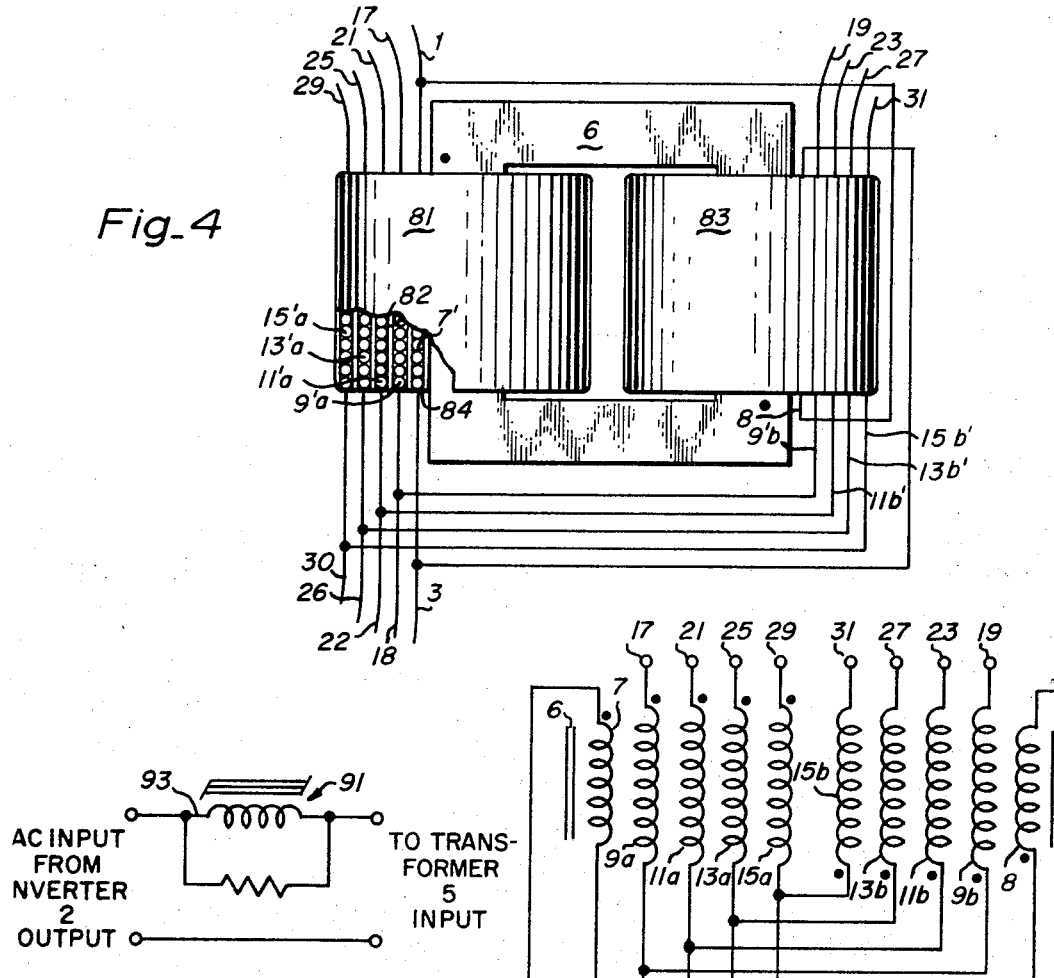
Fig. 4
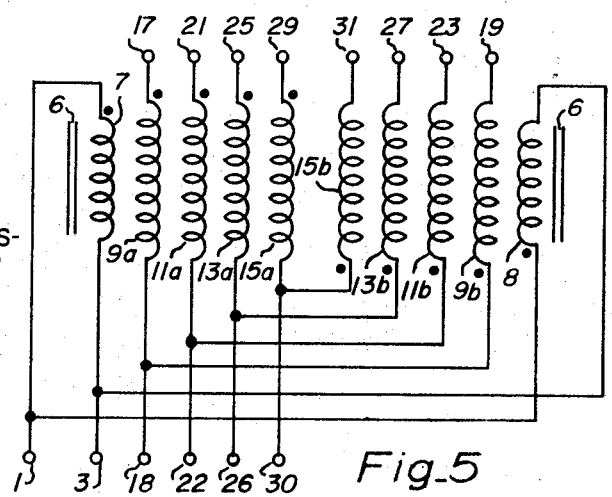
Fig. 5
Fig. 6
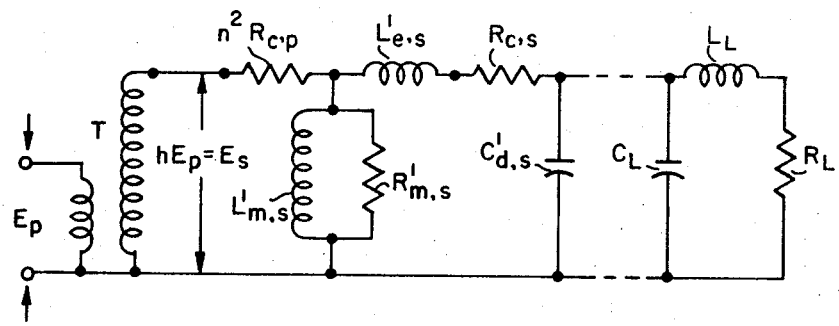
Fig. 7
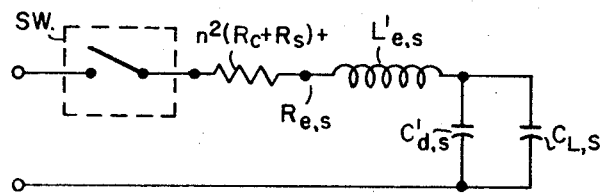
Fig. 8

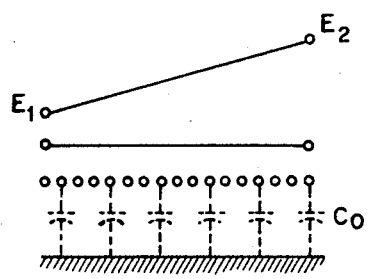
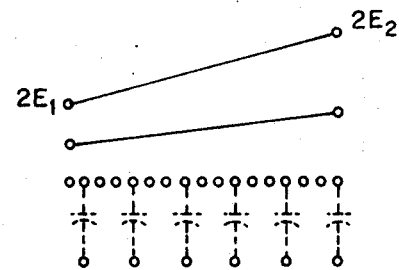
Fig.9  Fig.10
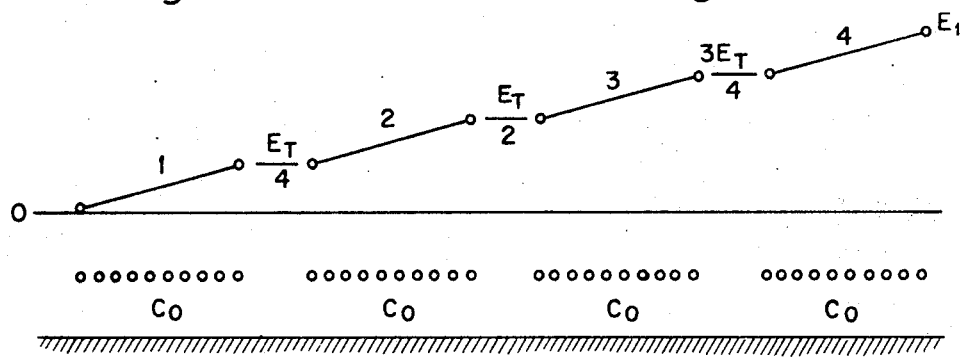
Fig.11
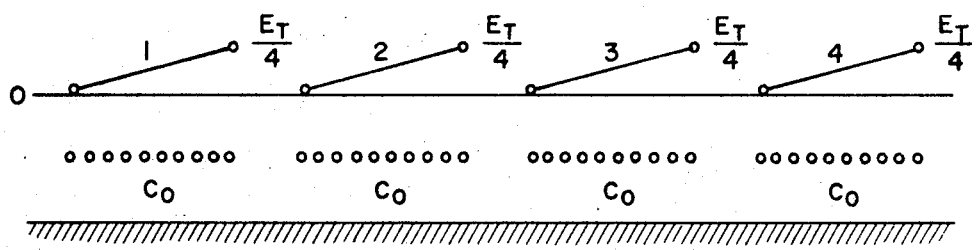
Fig.12
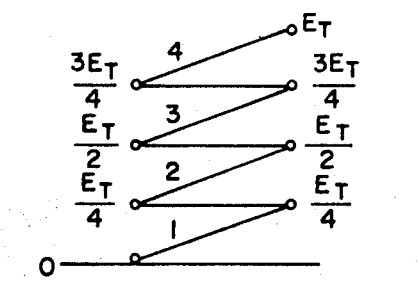
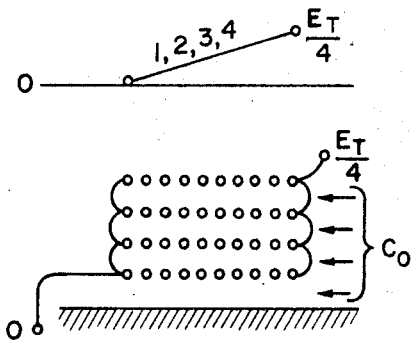
Fig.13  Fig.14

ELECTRICAL INVERTER-RECTIFIER CIRCUIT AND INDUCTOR APPARATUS THEREFOR

FIELD OF THE INVENTION

This invention relates to electrical inverter-rectifier circuits and apparatus therefor and, more particularly, to electrical inverter-rectifier circuits and apparatus therefor for converting low level DC voltages to a high level DC voltage with maximum electrical efficiency and minimal distributed capacitance effects.

BACKGROUND OF THE INVENTION

Numerous prior art electrical systems incorporate an electrical converter as part thereof in which a given DC voltage pulse or constant DC voltage of one predetermined voltage level is converted to a corresponding voltage of a higher level. One such electrical system is found in modern aircraft power supply systems which produce high electrical voltages for providing power to equipment containing traveling wave tubes and other types of microwave tubes.

Nominally, the elements of an inverter include an electronic switching device or chopper by which a DC voltage applied to the input of the switching device is converted into a series of square wave alternating voltage pulses by alternate on and off operation of the switching devices. These alternating voltage pulses are then applied to the input of a transformer which transforms them to a high level of alternating voltage at the output of the transformer. This AC output voltage is rectified and filtered to provide at its output a corresponding high direct voltage.

The alternating voltage pulses are on the order of 2,000-volts peak and a fundamental frequency of 6,000 to 15,000-Hertz in the cited aircraft power supply system. In past practice the voltage pulses depart considerably from the rectangular shape, become distorted, and result in loss of power and efficiency due to inherent electrical characteristics of the inverter portion of the circuit. For example, in operation of the electronic converter switch which provides the alternating polarity pulses there is always a small but finite transition time between its "off" and "on" positions. If a transient current flows during this transition time it increases the power that must be dissipated in the switch and therefore lowers the overall efficiency of operation thereof. With the inherent electrical properties of the prior art components of the converter circuit, more particularly relatively high effective circuit capacitance, such transient current charges the circuit capacitance during the switch transition period. This energy is consequently lost by dissipation at the switch and does not appear as useful energy at the output of the converter circuitry. The higher the frequency of the applied signal the more energy proportionally is lost in this manner.

Additionally, modern inverters or "chopper" which initially convert the direct voltage to a pulse voltage are constructed with transistors or other solid state devices functioning as switches. The current surges during the transition to the Off switch condition creates in addition "ringing" or extreme reversals of direction of current flow which in turn places a high "back" voltage across those transistors. This back voltage sometimes exceeds the breakdown voltage of the transistors. As a result the transistors have been prematurely destroyed.

OBJECTS OF THE INVENTION

Accordingly, it is an object of my invention to provide a novel electrical inverter-rectifier circuit.

It is a further object of my invention to provide an inverter-rectifier circuit which minimizes distributed capacitance.

It is a still further object of my invention to provide electrical inverter-rectifier circuit and apparatus therefor having an improved electrical efficiency and minimal electrical strain on transistor choppers.

And it is an additional object of my invention to provide a novel multiple section choke having a minimum distributed capacitance.

BRIEF DESCRIPTION OF INVENTION

In accordance with the invention, the inverter-rectifier circuit includes a transformer that contains a plurality, for example four, in one embodiment of secondary windings of substantially identical construction that are insulated from one another and wound over a magnetic core, one atop the other. The output of each secondary winding is connected to one of a corresponding plurality of rectifier circuits and the output of each of the plurality of rectifiers is placed electrically in series so as to provide a summing circuit for addition of the output voltages. Suitably the summing circuit includes a plurality of capacitors, corresponding in number to the number of rectifier circuits, and these capacitors are placed electrically in series across the output of the converter circuit. In accordance with another aspect of the invention the rectifier assemblies are connected in series with corresponding filter chokes or inductors, as variously termed. In accordance with a still further aspect of the invention a novel filter choke includes a plurality of inductor windings mounted atop one another on a single iron core. And lastly, a modified input arrangement comprises a nonlinear inductor coupled to the transformer input and a resistor in shunt with the nonlinear inductor.

The foregoing and other objects and advantages of my invention together with its elements, function and mode of operation and equivalents and substitutions for the elements thereof, become more apparent to the reader from a consideration of the following detailed description of the preferred embodiments of my invention considered in connection with the figures comprising the drawings.

DESCRIPTION OF THE DRAWINGS

In the drawings:

FIG. 4 is a mechanical illustration of the inverter transformer used in the electrical inverter-rectifier illustrated in FIG. 1;

FIG. 5 is a schematic illustration of the winding arrangement in the transformer of FIG. 4;

FIG. 6 illustrates a delay inductor of my invention which can be used with the electrical converter of FIG. 1;

FIGS. 7 to 14 are schematic illustrations used in connection with the explanation of the theory of the invention and the reduction in distributed capacitance obtained through use of my invention.

DETAILED DESCRIPTION OF INVENTION

Figure 1:
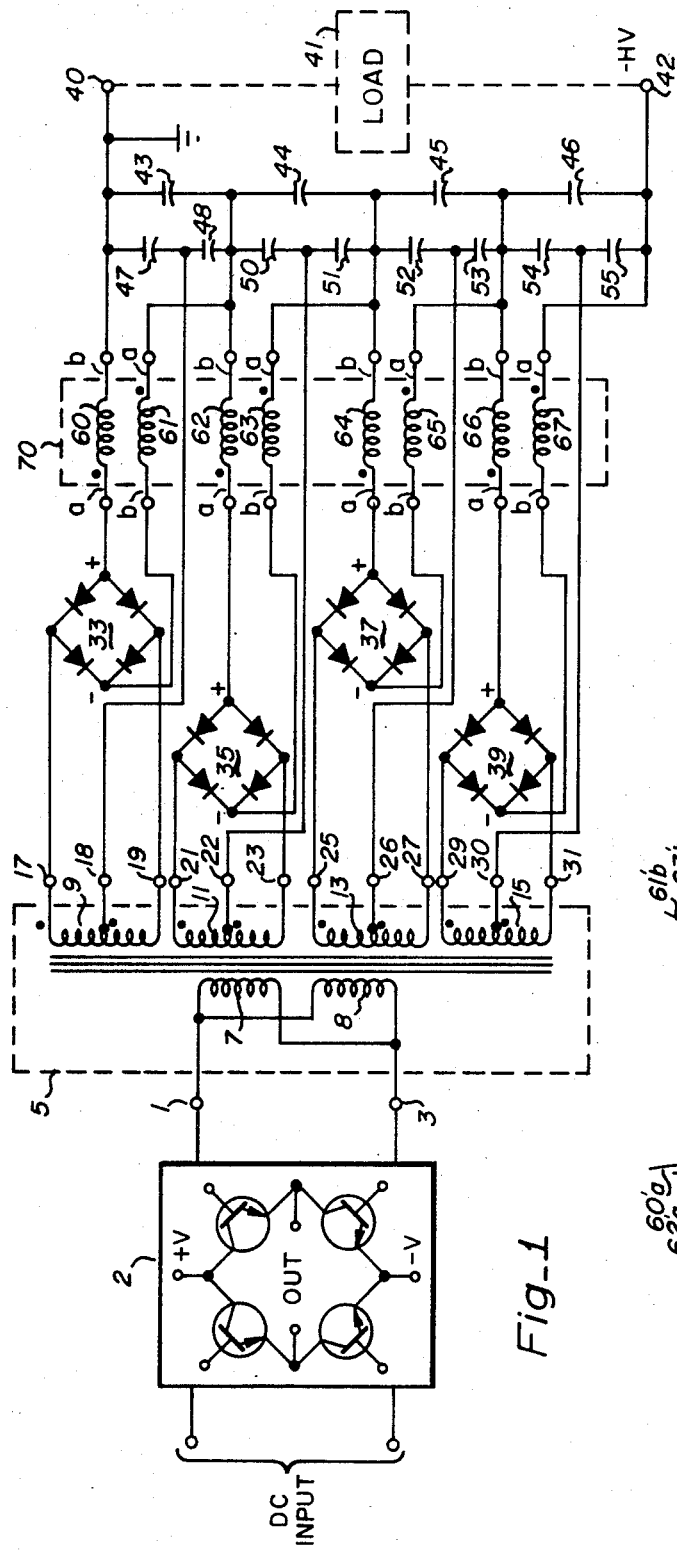
FIG. 1 schematically illustrates the electrical inverter-rectifier circuit of the preferred embodiment of the invention.

A conventional inverter or "chopper" switch 2 is represented symbolically in FIG. 1. Typically a chopper includes a bridge of four transistor switches and alternately one pair of which turns on while the other pair is turned off. This device converts a direct voltage applied at the DC input into a series of square wave alternating voltage pulses. Reference may be made to Chapter 5, *Silicon Power Transistor Handbook*, First Edition, 1967, published by Westinghouse Electric Company, for specific circuit examples. The inverter 2 is connected to input terminals 1 and 3 of inverter transformer 5. Transformer 5 includes a magnetic core 6, a first primary winding 7, and a second primary winding 8 that is connected together in parallel circuit and in phase with the first primary winding. The primary windings are connected across input terminals 1 and 3. Transformer 5 includes a plurality of four secondary windings, labeled 9, 11, 13 and 15, wound around and mounted on core 6. Each of windings 9, 11, 13 and 15 are substantially identical to one another and consist of the same number of turns of the same size and type of wire. In addition the secondary windings are electrically isolated from one another and, as hereinafter more specifically described in connection with FIGS. 4 and 5, are wound in layers one atop the other starting with winding 9. Secondary winding 9 is center tapped into two equal portions, 9a and 9b. The positive polarity end of winding portion 9 is connected to terminal 17, the negative polarity end of winding 9 is connected to terminal 19, and the center tap of winding 9 is connected to terminal 18.

Conventionally, transformer and inductor windings are assigned a "polarity", that is for a given coil of wire forming a transformer winding one end is considered a positive polarity end and the other end is considered a negative polarity end. With alternating voltages polarity has no meaning since the actual polarity of the instantaneous alternating voltages changes from positive to negative in each cycle of AC. However when a second coil of wire forms another winding of a transformer, polarity is significant particularly if the two windings are to be connected together. Thus the second winding has a positive polarity end and a negative polarity end. If it is desired to add voltages induced in the separate windings from the primary winding, then the positive polarity terminal of one winding is connected to the negative polarity terminal of the other winding, the windings are thus placed in series additive phase and the summed voltage is taken across the remaining ends. To subtract voltages alternately the positive polarity terminals of the windings would be connected together. In essence, given a plurality of transformer windings, if the alternating voltage at one end is positive at one portion of an AC cycle those ends of the other windings which are also positive at that same portion of the AC cycle, and hence in phase, are of the same polarity and these ends may be arbitrarily designated the positive polarity end. For a more complete description of this convention the reader is referred to available textual literature.

A point of center tap in a given transformer winding can thus be considered as a series connection in phase of two separate windings so that the voltages induced in each winding are additive and hence the center tap location is the juncture of a positive polarity terminal of one half winding and the negative polarity terminal of the other half winding. The positive polarity end of the winding is represented in the drawings by a dot, ., adjacent the end, while the negative polarity end is not otherwise marked. With the foregoing review of AC polarity conventions in mind the construction of the invention is better understood.

In like manner, the positive polarity end of winding 11 is connected to terminal 21, the negative polarity end is connected to terminal 23, and the center tap is connected to terminal 22; the positive polarity end of secondary winding 13 is connected to terminal 23, the negative polarity end is connected to terminal 27, and the center tap is connected to terminal 26; the positive polarity end of winding 15 is connected to terminal 29, the negative polarity end is connected to terminal 31, and the center tap is connected to terminal 30.

Four full wave bridge rectifiers, 33, 35, 37 and 39, are included. Each one of the bridge rectifiers is connected across a corresponding one of the secondary windings as indicated in FIG. 1. Each bridge rectifier circuit is conventional and consists of four rectifier diodes arranged as illustrated. Thus bridge rectifier 33 has its input terminals connected to terminals 17 and 19 so as to receive the voltage output from secondary winding 9; bridge rectifier 35 has its input terminals connected across the output terminals 21 and 23 to receive voltages from secondary winding 11; bridge rectifier 37 has its input terminals connected across output terminals 25 and 27 to receive voltages from across secondary winding 13; and bridge rectifier 39 has its input terminals connected across the output terminals 29 and 31 to receive voltages from secondary winding 15.

A pair of output terminals 40 and 42 connects the output of the inverter-rectifier circuit of the preferred embodiment in FIG. 1 to an electrical load 41, indicated by the dashed lines. The electrical load can comprise, by way of example, a traveling wave microwave tube in a system which requires power for short intervals of time at a particular repetition rate, or can comprise any load which by contrast requires a steady supply of power. Terminal 40 is connected to electrical "ground" potential and terminal 42 provides the negative polarity (minus HV) high voltage output as indicated in FIG. 1.

A series of four identical capacitors, 43, 44, 45 and 46, are connected in series electrically across output terminals 40 and 42. A second series of two series-connected capacitors are formed across each of the aforementioned capacitors. Thus capacitors 47 and 48 are connected electrically in series and are connected across or in parallel circuit with capacitor 43. Capacitors 50 and 51 are placed electrically in series and this series network is connected across capacitor 44; capacitors 52 and 53 are placed in series electrically and this series network is connected across capacitor 45; and capacitors 54 and 55 are placed in series electrically and this series network is connected across capacitor 46.

Eight electrical inductors or filter choke elements, as variously termed, designated 60, 61, 62, 63, 64, 65, 66 and 67 in FIG. 1 are provided. Each of inductors 60 through 67 are substantially identical in construction consisting of the same number of turns of wire. As is more specifically described hereinafter, the windings are divided into two groups which are placed on a single magnetic core 70 with the windings in each group wound one atop the other in a manner which minimizes distributed electrical capacitance.

Inductor 60 is connected with its positive polarity terminal, terminal a, the positive (+) polarity output of bridge rectifier 33 and at its negative polarity end, terminal b, to one end of capacitors 43, 47 and output terminal 40, to place the inductor electrically in series therebetween.

Inductor 61 is connected at its negative polarity end, terminal b, to the negative (−) polarity output terminal of rectifier 33 and at its positive polarity end, terminal a, to the negative polarity terminal b of inductor 62 and electrically in common with the electrical juncture between series connected capacitors 43 and 44 and, hence, to one end of capacitor 48 to place inductor 61 in series therebetween.

Inductor 62 is connected at its positive polarity end, terminal a, to the positive (+) polarity output of rectifier 35 and at its negative polarity end, terminal b, to juncture of capacitors 43 and 44, terminal a of inductor 61 as previously described, to place inductor 62 in series therebetween.

Inductor 63 is connected at its negative polarity and, terminal b, to the negative polarity output terminal of bridge rectifier 35 and at its positive polarity end, terminal a, to the negative polarity terminal of the next succeeding inductor 64 and electrically in common with the juncture of series connected capacitors 44 and 45 to place inductor 63 in series therebetween.

Inductor 64 is connected at its positive polarity end, terminal a, to the positive output terminal of bridge rectifier 37 and at its negative polarity end, terminal b, to terminal a of inductor 63 as above described, and to the juncture of capacitors 44 and 45 to place inductor 64 electrically in series therebetween.

Inductor 65 is connected at its negative polarity end, terminal b, to the negative (−) polarity output terminal of bridge rectifier 37 and at its positive polarity end, terminal a, is connected electrically to the terminal b of the next succeeding inductor 66 and to the juncture of the series connected capacitors 45 and 46 to place inductor 65 in series circuit therebetween.

Inductor 66 is connected at its positive polarity end, terminal a, to the positive (+) polarity output terminal of bridge rectifier 39 and at its negative polarity end, terminal b, to terminal a of inductor 65 and to the juncture of capacitors 45 and 46 to place inductor 66 in series therebetween.

Inductor 67 is connected at its negative polarity end, terminal b, to the negative (−) polarity output terminal of bridge rectifier 39 and at its positive polarity end, terminal a, is connected electrically to the output terminal 42 to place inductor 67 in series therebetween.

Terminals 18, 22, 26, and 30, connected to a center tap on each of the secondary windings of transformer 5, are electrically connected to the juncture of a respective corresponding one of the series capacitor networks. Thus, terminal 18 is electrically connected to the juncture of capacitors 47 and 48; center tap terminal 22 is connected to the juncture of capacitors 50 and 51; center tap terminal 26 is connected electrically to the juncture of capacitors 52 and 53; and center tap terminal 30 is connected electrically to the juncture of capacitors 54 and 55.

Figure 2:
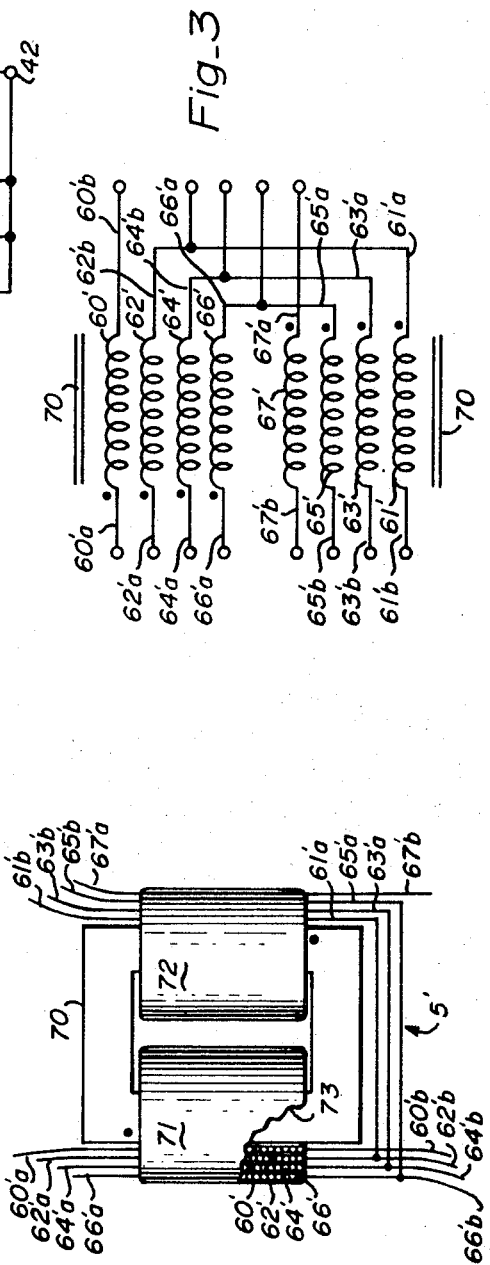
FIG. 2 is a mechanical illustration of a novel filter choke of my invention which is used in the inverter-rectifier circuitry of FIG. 1.

For convenience, where the same element is referred to in more than one figure, the same identifying numeral is used. Thus, FIG. 2 illustrates more specifically the mechanical construction of the inductors 60 through 67 employed in the embodiment of FIG. 1. This includes a rectangular or O-shaped magnetic core 70 which, as is conventional, comprises a stack of thin magnetic iron laminations of the "U—U" construction. A first coil form or assembly 71 is mounted on the left leg of the core and a second coil assembly 72 is mounted on the right opposed leg of core 70. Each coil assembly includes four layers of separate windings of electrical wire and each layer of wire forms an inductor or choke. All the windings have the same number of turns and are of the same wire size and type. The positive polarity ends of the windings in either coil form face the same direction along the core as indicated by the polarity dots. For purposes of illustration, a portion of coil assembly 71 is cut away as indicated by the break line 73. As is conventional, the coil assembly includes an insulating layer or tube 64 with which to insulate the electrical conductors of the first layer of winding from iron core 70. Atop insulative tube 64 is a first winding 60′ electrically conductive wire which forms inductor 60. Atop winding 60′ is a second like winding 62′ also forming a single layer, which forms inductor 62. A third winding 64′ is wound atop winding 62′ also in a single layer, which forms inductor 64; and a fourth winding 66′ is wound in a single layer atop winding 64′ which forms inductor 66. Each of these windings is of a like number of turns and inductance, and each layer of winding is separated from the preceding winding by a wrapping of conventional insulating material, not illustrated, so as to electrically isolate the windings. An outer wrapper of insulating material, as is conventional, covers the outer winding 66′. As becomes apparent, the alternating potential difference between windings in the coil assembly 71 ideally should be zero, and thus the insulation required need only be suitable for the DC voltage across its fraction of the output. The dot marked at the upper side of the coil 71 indicates that the start of each of the windings in the coil assembly is at that end.

In like manner and of identical construction, coil assembly 72 is built up of four separate windings in individual layers including windings 61′, 63′, 65′ and 67′, which form the inductors 61, 63, 65 and 67 in FIG. 1. The positive polarity end of the windings in coil assembly 72 depicted by the dot is located at the bottom of the coil assembly in the figure.

A lead is brought out from the positive polarity and negative polarity ends of each winding. For convenience, the positive polarity end of each inductor winding is designated by an "a" and the negative polarity end by a "b". This includes the lead 60a′ of winding 60′, lead 62a′ of winding 62′, lead 64a′ of winding 64′, and lead 66a′ of winding 66′ and corresponding leads 60b′, 62b′, 64b′ and 66b′.

With reference to coil assembly 72, the electrical leads to the positive polarity ends of each of the windings is indicated as 61a′ of winding 61′, 63a′ of winding 63′, 65a′ of winding 65′, and 67a′ of winding 67′. In like manner, the leads to the negative polarity ends of the windings of coil assembly 72 are indicated by leads 61b', 63b', 65b' and 67b'. Leads 63a', 65a' and 67a' of coil assembly 72 are spliced to the corresponding leads in coil assembly 71, namely 60b', 62b' and 64b', respectively, to place the positive polarity ends of those respective windings of coil 71 electrically in common with a respective corresponding one of the negative polarity ends of the windings in coil assembly 72. As reference to FIG. 1 shows, the leads are connected electrically in circuit as illustrated and, although these connections can be accomplished alternatively at an external terminal, a splice is preferred. The core 70 contains two identical air gaps or breaks in the magnetic core, one of which is located under coil assembly 71 and the other of which is located under coil assembly 72, which are not illustrated in FIG. 2. The air gaps are formed by spacing the ends of opposed laminations forming the core or in any other conventional manner. The air gaps provide a high magnetic reluctance in the magnetic circuit of core 70 and thus serves to prevent core 70 from magnetically saturating during operation and thus constitutes the inductors as linear inductors. The inductor unit of FIG. 2 may be enclosed in a metal container and potted, suitably in epoxy, as is conventional, with the leads extending out of the container.

Figure 3:
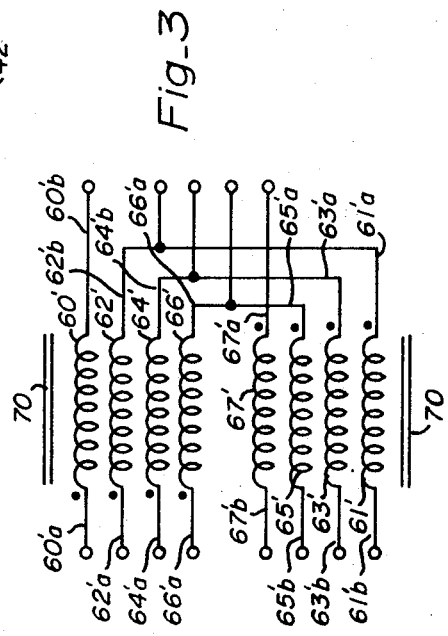
FIG. 3 is a schematic illustration of the choke of FIG. 2.

An electrical schematic of the multisection inductor is present in FIG. 3. In the schematic the windings and leads which correspond to the windings and leads of the physical structure of FIG. 2 are given the same designation. Thus the two opposed legs of core 70 are illustrated as well as windings 60', 62', 64' and 66' of coil assembly 71 of FIG. 2 and windings 61', 63', 65' and 67' of coil assembly 72 of FIG. 2. Further the windings 60', 62', 64' and 66' are schematically illustrated in spaced relation to the core leg 70 in the same order in which they are wound in layers upon the core as illustrated in FIG. 2. Likewise the windings 61', 63', 65' and 67' are schematically illustrated in spaced relation to the opposed core leg 70 in the same order in which they are wound in layers upon the core as illustrated in FIG. 2. The dot adjacent the winding end represents the positive polarity end of the respective winding.

It is clear from this schematic that the innermost or first winding of one coil assembly and the outermost or last winding of the second coil assembly are not electrically connected. However each of the other windings of the first coil assembly have their negative polarity ends connected electrically in common with the positive polarity end of a corresponding one of the other windings of the second coil assembly.

The tabulation of connections for the windings—the first winding of the coil is the one most proximate the core:

| Coil 71<br>Negative polarity end of this winding | Coil 72<br>Positive polarity end of this winding |
| --- | --- |
| 2nd (62') | 1st (61') |
| 3rd (64') | 2nd (63') |
| 4th (66') | 3rd (65') |

Generalizing, the negative polarity end of the $X_{2,3...N}{}^{th}$ winding of one coil assembly is connected to the positive polarity end of the $X-1_{2,3...N}{}^{th}$ winding of the second coil assembly, where $X = 2$ and goes in integral steps between 2 and N, where N is the number of separate windings in each coil assembly and is also equal or greater than 2. In the example of the embodiment N equals 4.

Each of the inductors has two functions in the inverter-rectifier circuit of FIG. 1. First, in combination with the corresponding capacitor to reduce or eliminate ripple voltages from the rectified direct voltages and, secondly, to maintain current flow to the load during the complete voltage reversal transition period of the chopper. For the latter function the ratio of inductance, L, of the inductor to the load resistance must define a time constant suitably long enough, greater than the chopper transition time, to permit the energy stored in the magnetic field of the inductor ($\frac{1}{2} LI^2$) to supply current to the load during the transition period. Stated otherwise, the inductor must be large enough to store enough energy to supply direct current to the load without completely reducing the stored energy to zero for the maximum rated off-time for the switching system. Preferably the watt second ($\frac{1}{2} LI^2$) capacity of the inductor is 50 percent greater than the watt-seconds (volts $x$ amps $x$ off-time) required by the load during the "off" period. For example, one typical electrical load, a traveling wave tube requires 10,000 volts at 2 amperes peak with a maximum "off" period of the chopper of between $\frac{1}{2}$ microsecond and 60 microseconds. This provides a watt-second capacity of $10,000 \times 2 \times 60 \times 10^{-60}$ or 0.012 watt-seconds. Accordingly, the total inductance of the inductors is obtained as $L = 0.012/(\frac{1}{2} I^2) = (0.012 \times 2)/(2)^2 = 0.006$ henries or 6 millihenries in this specific example. Thus each of the eight inductor portions 66 through 67 has an inductance of 6/8 mh. or 0.75 millihenries.

The construction of the inverter transformer 5 presented in FIG. 1 is better understood and illustrated by FIG. 4. The transformer is of the "core" type and includes a magnetic core 6 which suitably comprises an "0" or rectangular-shaped geometry constructed of a stack of conventional thin U and I shaped iron laminations in a conventional manner. A first coil assembly 81 is mounted about the left leg of core 6 and a second coil assembly 83 is mounted about the right leg of the core. A portion of coil assembly 81 is cutaway at 82 to illustrate in cross-section the various windings which form the coil assembly. This includes an insulating tube 84 mounted around and insulating the electrical windings from core 6. Atop the insulating tube is wound primary winding 7'. Secondary winding portion 9a' is wound atop winding 7'. The next winding layer is secondary winding 11a', atop winding portion 11a' is located secondary winding portion 13a'; and atop winding portion 13a' is winding portion 15a'. An insulating wrapper is wound about the outside of winding 15a'. A layer or wrapping of insulating material, not illustrated, is included between each winding 7' through 15a'. The insulation between windings 9' through 15' in the secondary need be sufficient to withstand a portion of the direct voltage inasmuch as the alternating potential difference between the windings, if any, is negligible, as hereinafter becomes apparent. The insulation between the primary 7' and both the core and coil 15' should be capable of withstanding full DC voltage to ground (core). Each of the secondary windings in coil assembly 81 are substantially of the same number of turns wound in a single layer so as to have the same voltages induced from primary winding 7 in accordance with the transformation or turns ratio desired or selected to obtain the desired output voltage. As is further noted, each of the windings of secondary windings 9a', 11a', 13a', and 15a' and 15a' comprise one-half of each of the secondary windings 9, 11, 13 and 15 of transformer 5, schematically illustrated in FIG. 1. Coil assembly 83 and its windings identical in construction to coil assembly 81 and includes an insulating tube with primary winding 8' wound thereabout followed by secondary winding portions 9b', 11b', 13b' and 15b', in separate layers with an insulation layer between each. As indicated by the dot adjacent the top of coil assembly 81, the positive polarity end of each winding is at the extreme upper end of the coil assembly and each winding is wound in a single layer. In like manner the dot representing the positive polarity end of the coil windings of coil assembly 83 is at the extreme bottom end.

As indicated by leads 1 and 3 the primary coil windings 7' and 8' are electrically connected in parallel. Leads 17', 21', 25' and 29' extend from the positive polarity or "dot" end of windings 9a', 11a', 13a' and 15a', respectively. Likewise leads 19', 23', 27' and 31' at the upper end of coil assembly 83 extend from the negative polarity end of secondary winding portions 9b', 11b', 13b' and 15b', respectively. The negative polarity end of the winding portions in coil assembly 81 and the positive polarity end of the windings in coil assembly 83 are spliced together and are brought out as a single lead: Thus lead 18' forms the center tap connection between secondary windings 9a' and 9b'; lead 22' the center tap lead between windings 11a' and 11b'; lead 26' the center tap connection for the secondary consisting of 13a' and 13b'; lead 30' the center tap connection for the secondary winding consisting of 15a' and 15b'.

It is noted that given a more elongated core construction, the coil assembly 83 could be moved around and mounted next to or side by side with coil assembly 81 on the same left transformer leg, and, in fact, each coil assembly could be wound in a single assembly. However, by making the core configuration more compact as illustrated in FIG. 4, and splitting the portions of the secondary windings onto two different core legs, the magnetic efficiency of the transformer is optimized.

The schematic of FIG. 5 more accurately portrays the winding arrangement of the transformer of FIG. 4. Thus primary winding 7' is illustrated adjacent a magnetic core 6 and the spaced windings 9a', 11a', 13a' and 16a' are juxtaposed serially in order of their proximity to the primary winding 7. In like manner the other primary winding 8' is located adjacent secondary winding portions 9b', 11b', 13b' and 15b'. As denoted by the dots at the upper end of windings 9a through 15a the positive polarity end of the winding is opposite to that illustrated for the half of the windings 9b through 15b where the dot is located at the bottom end. The electrical leads previously described connect the winding portions to place them electrically in series so that the voltages across same as may be induced by the primaries are additive and in phase.

Reference is again made to the inverter-rectifier circuit in FIG. 1. In operation, the source of low level DC supplies the DC power to the inverter at the DC input terminal illustrated in FIG. 1. The inverter switching device 2 converts the DC into an alternating square-wave voltage, in one example at a 10 kilohertz rate, which is applied between input terminals 1 and 3 of the inverter-rectifier circuit of FIG. 1. This voltage is stepped up or transformed by transformer 5 into a higher AC voltage which appears across the output of each of the four secondary windings 9, 11, 13 and 15. Considering separately transformer secondary winding 9, the AC voltage appearing across winding 9 is applied to the input terminals of bridge rectifier 33. Bridge rectifier 33 rectifies the AC voltage into a full wave DC at its output terminals, indicated by the plus and minus symbols, and current is coupled through inductor windings 60 and 61 to charge capacitor 43 and, as becomes apparent, to supply current to load 41. Inductors 60 and 61 and capacitors 43 reduce or eliminate any ripple voltages that appear in the direct voltage. Additionally the inductors store energy and therefore provide continuous current flow to the load during any transition time in the inverter. This is required where the converter system is incorporated within time ratio control circuits. The center tap lead 18 of transformer winding 9 is coupled to the midpoint of the series connected capacitors 47 and 48. Capacitors 47 and 48 are of a very small value on the order of 0.001 microfarads. With this connection, any imbalances due to leakage between the two halves of secondary winding 9, 9a, and 9b, or the associated rectifiers that may lead to unequal voltages are balanced or minimized by maintaining the center tap precisely at one-half the potential of the full winding voltage. Absent this connection, should any appreciable imbalance exist, some effects of distributed capacitance may reoccur since the winding halves would no longer have equal alternating voltages.

Concurrently with the foregoing operation and in like manner, the same magnitude of alternating voltage is induced from the primary winding in each of the other secondary windings 11, 13 and 15, and all provide the same output wave form. Each of the bridge rectifiers 35, 37 and 39 rectifies the voltage applied to its respective input terminals into a DC voltage which appears across its respective output terminals as denoted by the plus and minus polarity symbols in the drawings, and direct current from each is coupled via an inductor circuit to charge a corresponding one of the respective capacitors 44, 45 and 46: The output from rectifier 35 is applied to capacitor 44 through inductors 62 and 63. The output of bridge rectifier 37 is coupled across capacitor 45 through inductors 64 and 65, and the output of bridge rectifier 39 is coupled via inductors 66 and 67 across capacitor 46. In like manner to the first described circuit, the center taps 22, 26 and 30, respectively, of windings 11, 13 and 15, are coupled to series capacitors 50 and 51, 52 and 53, 54 and 55, which acts to maintain a balance of the voltages in each half of the transformer windings during the transition periods of inverter 2. The voltages applied across capacitors 43, 44, 45 and 46 individually are added together or summed as a result of their series connection and the voltage across output terminals 40 and 42 is the sum of the individual voltages.

Suitably capacitors 43, 44, 45 and 46 are sufficiently large enough in value so as to store sufficient electrical energy to supply the particular electrical load with current during the time the load is in operation with minimal drop in voltage or voltage "droop". By way of specific example, a microwave tube load requires 10,000 volts at 2 amps for 1.5 microseconds duration at a repetition rate of 10 KHz, or 10,000 times per second. A value of 0.1 microfarad capacitance is found suitable for each of capacitors 43, 44, 45 and 46 in that example for that application.

Figure 15:
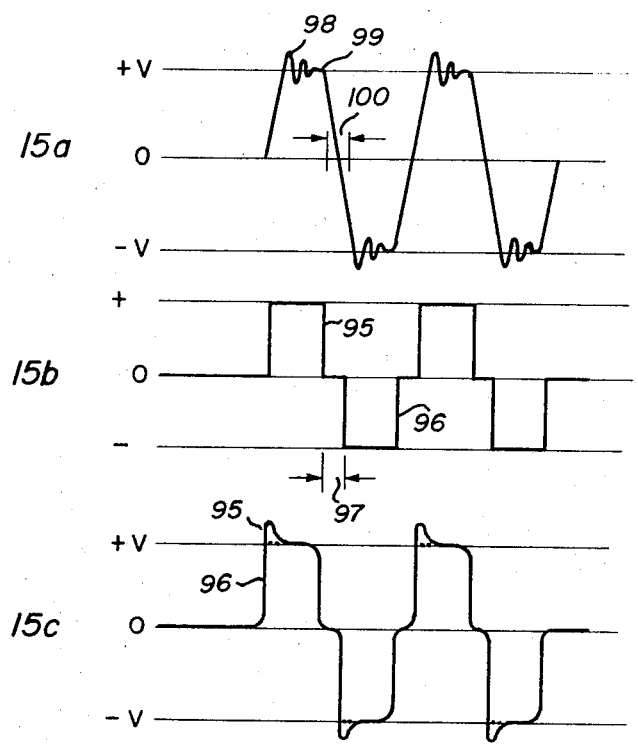
FIGS. 15a through 15c illustrate the wave shapes of voltages applied to the converter input.

FIG. 15 illustrates the output voltage waveshapes of the inverter switch 2 which appear across the primary windings 7 and 8 of inverter transformer 5 in FIG. 1. Considering an ideal waveshape such as FIG. 15b the waveshape is ideally square and alternates from the positive to the negative polarity. The space 97 between the end of the first positive pulse 95 and the first negative 96 pulse represents the off-time of the inverter switching device. Particularly in time ratio control systems in which inverter-rectifier circuits are employed, the off-time is varied—made larger or smaller, it is desirable to have the space of off-time between pulses sharply defined.

In FIG. 15a the inverter output voltage is illustrated as it would appear prior to my invention as applied to the input transformer of a conventional inverter-rectifier circuit. Disregarding the overshoot portion 98 of pulse 99, which is hereinafter discussed, the off-time 100 between pulses is clearly not well defined. This lack of squareness is caused by charging up of distributed capacitance in the conventional circuit. Such charging current creates power which is dissipated by the switch and otherwise lost resulting in a lower overall electrical efficiency in the system. With my invention this is eliminated and the pulses fully approximate the ideal square shape, including the elimination of the overshoot portion by means hereafter discussed.

In this inverter-rectifier application a voltage regulating function is incorporated by time ratio control. This is a form of pulse width modulation of the inverter output alternating voltage. In that, the frequency of the inverter output signal is held constant but the ratio of "on" time to "off" time of the electronic switches performing the inverter function is varied which thereby varies the ratio of the average output voltage to the average DC input voltage without materially affecting the ratios of peak output voltage to the direct voltage supplied to the inverter. This is conventional in inverter 2 of FIG. 1 and a suitable source of control voltage can be applied at terminal c of the inverter to provide that function. In such an application, however, capacitive input filters defeat the regulating function and accordingly inductive input filters must be used. The input inductance must be of a high enough value that it will maintain current flow to the load through freewheeling diodes or their equivalent during the interpulse period of maximum off-time. Thus the inductors store sufficient energy to maintain current to the load during this off-time.

A further addition to the preferred embodiment of FIG. 1 is illustrated in FIG. 6. This includes a nonlinear series inductor 91 suitably consisting of a winding wound on a nickel iron toroid core, suitably with a rectangular hysteresis characteristic which is placed electrically in series between the output of the inverter 2 of FIG. 1 and the input of the inverter transformer. A low value resistor 93 is placed in shunt across terminals 1 and 3 of the input. When the inverter switching device operates from its "off" to its "on" condition this inductor or delay inductor, as may be variously termed, is effective for a few microseconds during the turn-on time to allow the shunt resistors to limit the peak current through the inverter switches due to the charging current required by the effective distributed capacitance of the transformer when energized by a step-function voltage wave-form, as illustrated by the overshoot portion 95 of pulse 96 in FIG. 15. Thereafter the inductor core saturates and switches from a high to a very low impedance state and bypasses resistor 93. This sequence of events eliminates the overshoot and "squares" or flattens the pulse so that it more nearly approximates the ideal shape of FIG.15b.

As is noted, all of the individual inductors or filter chokes are wound on a common core and in a particular manner to provide the unique result of reducing distributed capacitance into the individual circuits that would occur through the use of conventional individual chokes. Inasmuch as an inductance is required to minimize the capacitive effect of the load in a time ratio controlled system, the inductance is necessary added to the circuit. In so doing, however, it is possible through the use of individual or separate chokes to reduce distributed capacitance, that is, the capacitance between the winding forming the inductance and the core or ground. By overlaying the windings of the individual chokes in the circuit of FIG. 1 onto a single core as illustrated in FIG. 2, wherein essentially equal currents flow in the circuits, the voltage appearing across the inductor winding in each of the circuits should be essentially the same, hence the alternating potential difference between the wires of one inductor winding and the wires of the adjacent inductor winding are essentially zero. As is more explicitly explained in a theoretical analysis hereinafter this specification, with a zero alternating potential difference between two metal parts the effective distributed capacitance therebetween is zero. By the inclusion of this choke in the circuit the input wave form is improved. Further, the unique transformer winding arrangement provided in this inverter circuit also minimizes the distributed capacitance that would be introduced by an otherwise conventional inverter transformer. The effect of this in combination with minimization of the distributed capacitance from the choke is evidenced by the wave shape noted in FIG. 15c. Thus, inasmuch as the current which flows during the transition period between the on-time and off-time of the converter switch is minimized, the overall electrically efficiency of the circuit is improved, and the generation of large reverse voltages which could damage the transistors in the chopper or inverter 2 is eliminated.

A critical mathematical analysis and explanation of the means by which the distributed capacitance is eliminated should prove helpful in understanding the theory of my invention.

FIG. 7 shows the simplified equivalent circuit of a transformer and load. The equivalent circuit is made with the assumption that the coefficient of coupling k l.c. between primary and secondary windings is greater than 0.99; an assumption that is usually valid with inverter transformers. This assumption permits lumping of the magnetizing inductance, $L'_{m,s}$ as a single element connected across the input to the remainder of the equivalent circuit. The equivalent circuit of FIG. 7 also assumes that the primary-to-secondary step-up turns ratio $n$ is high ($1:n = {^N}P/N_S$) on the order of 10 or higher so that the primary effective distributed capacitance can be neglected and the secondary-to-primary capacitance can be lumped with the effective secondary distributed capacitance, $C'_{d,S}$.

In FIG. 7 the following definitions are made:

T    Ideal transformer of ratio 1:n
where $1:n = {^N}P/N_S$ and $N_P$ is
primary turns and $N_S$ is

| | |
|---|---|
| $R_{c,P}$ | Resistance of primary winding conductor. |
| $R_{c,S}$ | Resistance of secondary winding conductor. |
| $R'_{m,S}$ | Equivalent core loss resistance as reflected to secondary. |
| $L'_{m,S}$ | Equivalent magnetizing inductance of secondary winding as reflected to secondary winding. |
| $C'_{d,S}$ | Effective distributed capacitance of secondary winding as reflected to secondary terminal voltage. |
| $C_{L,S}$ | Effective shunt capacitance of load on transformer secondary winding. |
| $R_L$ | Effective load resistance. |
| $L_L$ | Inductance of load (filter ind.). |
| $R_S$ | Resistance of source and switch. |

Since the coefficient of coupling is high, $L'_{m,S} \gg L'_{l,S}$, so for the short period of time of the leading edge of applied voltage pulse $L'_{m,S}$ and $R'_{m,S}$ can be neglected.

If the source of voltage $E_P$ has negligible impedance, then the equivalent circuit consisting of the transformer parameters and load parameters are the ones which determine the transient current of the leading edge when a step-function voltage is applied to the circuit by a switch, SW, of zero internal resistance. If they are not negligible, then they can be added to $n^2 R_{c,P}$ for analytical purposes. Thus $n^2 R_{c,P}$ becomes $n^2(R_{c,P} + R_S)$. With all values mathematically reflected to the secondary, a conventional technique in transformer analysis, a simplified equivalent circuit during the leading edge of a step voltage is obtained and is represented in FIG. 8.

$L_L$ and $R_L$ in FIG. 7 are omitted in the equivalent circuit of FIG. 8 since $L_L$ is so large, $L_L \gg L'_{l,S}$, as to effectively isolate $R_L$ from the transformer secondary for the high frequencies making up the leading edge switching transient.

Thus inductor $L'_{l,S}$ and capacitors $C'_{d,S}$ and $C_{L,S}$ form a network with a characteristic impedance $$Z_o' = \sqrt{L'_{l,S}/(C'_{d,S} + C_{L,S})} \quad (1)$$

and when the step function voltage $E_p$ is applied to the input terminal as represented by closing switch, SW, a transient current flows in the circuit.

If $n^2(R_{c,P} + R_S) + R_{c,S}$ is small compared to $Z_o$, then, to a first approximation, the peak current of the switching transient $I'_{pk}$ in the secondary winding can be calculated from the relationship:

$$I_{pk,S} \approx E_{ES}/Z'_o \quad (2)$$

The primary switching transient current $I_{pk,P}$ is then $N I_{pk,S}$, so $$I_{pk,P} \approx n(E_S/Z'_o) = n^2 E_P/Z'_o) = (n^2 E_P \sqrt{C'_{d,S} + C'_{L,S}})/(\sqrt{L'_{l,S}}) \quad (3)$$

The existence of the switching transient current represents a loss of energy. Thus equation 3 shows why it is important to reduce the effective shunt capacitance load, $C'_{d,S}$ and $C'_{L,S}$ on the transformer in order to reduce the peak transient current. Increasing $L'_{l,S}$ also decreases the peak transient current, but only at the expense of an increased rise time (slower rise) of the leading edge of the secondary voltage rectangular wave.

Since very little of the energy supplied by the transient current to charge the shunt capacitance is recovered in most inverter circuits, the higher the operating frequency the greater are the energy losses due to shunt capacitances.

In addition electronic switches, whether they be electron tubes, thyristors or transistors, require a finite time to switch from the blocking state to the conducting state. If the switch current rises appreciably during this transition period, it represents a loss of energy to the switch, with a resultant increase in power dissipation which the switch must handle and a decrease of inverter efficiency.

It is therefore desirable to keep shunt capacitance to a minimum to improve inverter efficiency as well as to reduce the peak currents through the electronic switch. The manner in which capacitances of a winding are converted to an effective shunt or distributed capacitance should be understood in order to understand the means devised by my invention to reduce the shunt capacitances.

The International Dictionary of Physics and Electronics, Van Nostrand, defines "distributed capacitance" as "the capacitance which is inherent in any coil because of the adjacent turns, layers, windings, etc., which are separated by some dielectric material and which have voltage differences between them. —This capacitance is often considered as lumped and in parallel with the true inductance of the coil (or other arrangement of conductors)." The same reference defines "effective capacitance" as follows: "The total capacitance found between two points." Thus the "effective distributed capacitance" of the secondary winding of a transformer is the effective capacitance found across the secondary terminals due to all inherent capacitances of the coil as reflected to those terminals.

For a given voltage $E_T$ across the terminals of a coil, the various capacitive elements of the coil will have some fraction of the voltage $E_T$ across them, depending upon the coil configuration and where the capacitive elements are located within the coil or between the coil and other coils and the core structure. At a given terminal voltage $E_T$, each capacitive element will store electric energy. The "effective distributed capacitance" of a coil is that capacitance which at a voltage $E_T$ will store an amount of electric energy which equals the sum of all of the electric energy stored in the capacitive elements of the coil when the terminal voltage is $E_T$. The "effective distributed capacitance" of a coil is calculated by use of this basic concept of equal energy storage.

The method for calculating the effective distributed capacitance of a winding is first considered for a simple single-layer coil structure adjacent to a core as shown by FIG. 9.

The capacitance $C_o$ is the capacitance between the coil winding and core with the winding treated as one plate and the core as the other plate of a parallel plate capacitor. As shown in the voltage distribution diagram above the coil, $E_1$ is the minimum voltage across $C_o$ and $E_2$ is the maximum voltage across $C_o$ when the reference terminal voltage is $E_1$. The effective distributed capacitance of the coil $C_d$ is then:

$$C_d = C_o \cdot (E_1^2 + E_1 E_2 + E_2^2)/(3 E_T^2) \quad (4)$$

It should be noted that all voltages in the above equation are alternating voltages of the same frequency. A direct voltage can be applied as a DC bias on the winding without affecting the validity of the above equation and will have no effect upon the effective distributed capacitance of the coil.

If one end of the coil is grounded so that $E_1 = 0$ and if $E_2 = E_T$, then
$$C_d = C_o \cdot (O + O + E_T^2)/(3\ E_T) = C_o/3 \qquad (5)$$

If the center of the coil is grounded and $E_1 = E_T/2$ and $E_2 = E_T/2$, then
$$C_d = C_o/2 \cdot (E_T^{2/4})/(3\ E_T^2) + C_o/2 \cdot (E_T^{2/4})/(3\ E_T^2) = C_o/12 \qquad (6)$$

Equation (6) shows that for the same total coil voltage, the effective distributed capacitance of a single-layer coil with its center-tap grounded is one-fourth of its distributed capacitance with one end grounded.

Equation (4) can be extended to a two-layer coil as shown by FIG. 4, considering only the distributed capacitance between the layers.

The effective distributed capacitance due to the capacitance $C_o$ between layers is then
$$C_d = C_o\ (\delta E_1 + \delta E_1\ \delta E_2 + \delta E_2^2)/(3\ E_T^2) \qquad (7)$$

This is the general equation used to calculate the contribution of each capacitive element of a coil or winding to the total effective distributed capacitance of the coil.

When the secondary of a high frequency inverter-rectifier transformer must deliver a high voltage DC, I have found it advantageous from a distributed capacitance consideration to sectionalize the secondary into three or four or more equal lower-voltage secondaries and then series their DC output voltages to secure the desired high voltage. The reduction of effective distributed capacitance which can be had by this method is illustrated by consideration of FIGS. 11 and 12 for a four-section secondary coil consisting of four single-layer section windings arranged side-by-side on a core.

If $C_o$ is the parallel-plate capacitance of each section to the core, the total capacitance of the winding to core will be $4\ C_o$. Since one end is at ground potential and the voltage across the windings increase linearly, equation (5) applies to FIG. 11 thus the effective distributed capacitance is:
$$C_d = 4\ C_{o/3} = 1.33\ C_o \qquad (8)$$

The capacitance of each winding reflected to its own terminals is:
$$C'_{d,1} = (C_o/3) = C'_{d,2} = C'_{d,3} = C'_{d,4} \qquad (9)$$

The total capacitance of the four windings reflected to the $E_{T/4}$ voltage level is then
$$C'_{d,T} = 4\ C_o/3 \qquad (10)$$

Reflecting this to the equivalent of the total terminal voltage $E_T$ to equate it to the AC connection requires multiplying by the inverse of the voltage ratio or 1/16, hence the equivalent total effective distributed capacitance for FIG. 12 is
$$C_d = 4\ C_o/3 \times 1/16 = C_o/12 = 0.0833\ C_o \qquad (11)$$

Comparing this equation (8), the effective distributed capacitance has been reduced by a factor of 16 by connecting the four-winding secondary coil in series on the DC side instead of on the AC side.

Now, suppose the transformer consisted of four layers, each layer wound in the same direction (unidirectional type layer winding). The conditions for AC and for DC series connections is described in connection with FIGS. 13 and 14.

In FIG. 13, the effective capacitance of the first layer to ground, as reflected to its own terminal is:
$$C'_{d,1} = C_{o/3} \qquad (12)$$

Each of the other three layers have a voltage $E_{T/4}$ across the entire spacing, so their capacitance as referred to their terminals is the same as if the layers formed parallel plates of a capacitance $C_o$, hence
$$C'_{d,2} = C'_{d,3} = C'_{d,4} = C_o \qquad (13)$$

The total effective capacitance as reflected to the $E_{T/4}$ voltage level is then
$$C'_{d,T} = C_o/3 + 3\ C_o = 10\ C_o/3 \qquad (14)$$

Multiplying by 1/16 to reflect to the voltage $E_T$
$$C_d = (10\ C_o)/(3 \times 16) = 5\ C_o/24 = 0.208\ C_o \qquad (15)$$

In FIG. 14 for the series connection on the DC side, the four layers of the coil are effectively in parallel since there is zero AC voltage between layers. The only capacitance which is effective in contributing to the total distributed capacitance is that of the first layer which, reflected to the $E_{T/4}$ voltage level is:
$$C'_{d,1} = C_o/3 \qquad (16)$$

When reflected to the $E_T$ voltage level
$$C_{d,T} = C_o/3 \times 1/16 = 0.0208\ C_o \qquad (17)$$

Comparing equation (15) with equation (17), the DC series connection has only one-tenth of the effective distributed capacitance of the AC series connection.

There are, of course, capacitances other than the layer-to-ground and layer-to-layer capacitances which contribute to the total effective distributed capacitance of a coil, but the effects of most of them are reduced by reducing the effective AC voltage in about the same proportion as the coil capacitances used in the above illustrations.

A like analysis can be made for the novel multisection inductor herein disclosed which provides the requisite degree of circuit inductance and is constructed so that it minimizes or eliminates distributed capacitance between windings of the inductor.

While the embodiment of an inverter-rectifier circuit, as disclosed, illustrates four "parallel" circuits to obtain the desired voltage by addition of the DC voltage and in which the inverter transformer includes four identical secondary windings wound over one another, it is apparent that this number can be reduced, for example to 2, or increased to 5, 6 or 7 or more integral numbers of parallel circuits, as desired.

The greater the number of parallel circuits employed, the more minimal distributed capacitance effects become, but correspondingly, the greater the number of component parts that must be used and accordingly the greater the expense. And at some point the amount of further improvement by further reduction in distributed capacitance by increasing the number of transformer secondary windings and ancillary rectifying circuits becomes economically marginal. Further it is predictable that at some large number physical limitations themselves would preclude undue or extremely large numbers of windings. Minimally, however, it is seen that some elimination of distributed capacitance in fact in the inverter transformer is obtained by merely breaking up the secondary winding into two parts.

It is preferably if here the meaning of some terminology hereinafter appearing in the claims is most conveniently discussed and defined. I refer to a plurality of "substantially identical" windings. In a given coil form that includes numerous individual windings as in the preferred embodiments, a first secondary winding is wound over a magnetic core in a single layer coil or single layer, a second winding is wound in a single layer atop the preceding winding, and so on, layer upon layer. These windings should comprise the same number of turns of wire of the same wire size and wire type so that the individual windings will be identical substantially in all respects important to my invention. However, it is apparent that since one winding is wound over another, the radius of the second winding is larger than the first, and likewise the radius of each additional winding will be larger than the preceding winding. Hence the windings are not truly identical to one another in the absolute sense. However, in the important respect to the construction of this invention, the various windings, although having different radii, are substantially identical and hence it is with this meaning that I hereinafter use the term "substantially identical".

Moreover, it is helpful to clarify further the designation of the transformer and inductor windings. Inasmuch as one transformer secondary and inductor winding is wound atop another winding, and so on, in both the transformer and inductor, I prefer to designate those windings starting with the designation "first" as the winding most proximate the magnetic core, relative to the other related windings, the "second" winding would be the winding atop the first winding; and so on, to the last specified or "Nth" winding located most remote from the core. Hence the designation of both the transformer secondary windings and the multisection inductor windings is sequential from the first to the Nth and this indicates the relative position of that winding to the transformer core relative to the other related windings. This is important in the description of my invention since in the particular construction of transformers and inductors an O or rectangular shaped core is employed as has been described, and each secondary winding is made up of two winding halves located on different core legs and connected electrically in series additive phase, i.e. the positive polarity terminal of one "half winding" connected to the negative polarity end of the other "half winding". Thus, the first secondary winding of the inverter transformer will consist of the first winding of the coil form on one core leg connected in series with the first designated winding of the coil form on the second core leg. The second secondary winding will consist of the series additive phase connection of the second winding in the coil form on the first core leg, with that of the second winding in the second coil form on the second core leg and so on, with the Nth designated secondary winding consisting of the Nth winding of the first coil form on the first core leg with the Nth designated winding of the second coil form located on the second core leg. The foregoing is similarly appropriate to the understanding of the connection of the inductor windings. A clear understanding of the winding designation at this point materially assists in understanding the rather complex means of winding connections found in my invention and hereinafter described in the claims.

The foregoing details and description of the preferred embodiments of my invention and the accompanying theoretical analysis are intended to enable one skilled in the art to make and use the invention as required by the patent laws. It is expressly understood that the invention is not limited to the details and description so presented inasmuch as many equivalents and substitutions for those elements in the preferred embodiments as well as additions thereto suggest themselves to those skilled in the art upon reading this specification. Accordingly it is expressly understood that the invention is to be broadly construed within the spirit and scope of the appended claims.

What I claim is:

1. An inverter-rectifier circuit comprising:

inverter switch means for converting a direct voltage applied to input to an alternating pulse voltage at an output;

transformer means, said transformer means having primary winding means connected to said output, and a plurality of secondary windings each having a positive polarity end, said secondary windings being wound one atop the other and electrically insulated from one another, and each of said secondary windings comprising substantially the same number of turns of wire and each being formed in one layer with the positive polarity end of each secondary winding at the same end of the layer;

a core of magnetic material forming a closed magnetic path surrounding a window opening and having first and second opposed core legs on opposite sides of said window opening;

and wherein said primary winding means comprises a first primary winding and a second primary winding electrically connected in parallel, said first winding being wound about said first leg of said core and said second winding being wound about said second leg of said core; and wherein each of said plurality of secondary windings comprises further first and second half windings connected electrically in series voltage additive relationship with said first half winding of each secondary winding being located on said first leg of said core and said second half winding of each secondary winding being located on said second leg of said core a plurality of rectifier means corresponding in number to said plurality of secondary windings, each of said rectifier means being connected to a corresponding one of said plurality of secondary windings for providing at its output a DC voltage; and summing circuit means connecting the outputs of each of said rectifier means electrically in series for summing up in additive polarity the individual output voltages thereof.

2. The invention as defined in claim 1 wherein said summing means comprises a plurality of capacitors corresponding in number to said rectifying means, said capacitors being electrically connected in series, and
means coupling each respective output of said plurality of rectifier means across a corresponding one of said series connected capacitors.

3. The invention as defined in claim 2 further comprising:
a plurality of choke inductor means and means connecting each respective one of said choke means electrically in series with a corresponding output of a rectifier means.

4. The invention as defined in claim 3 wherein said plurality of choke means comprises a single magnetic core, and a plurality of substantially identical single layer windings wound one atop the other upon said core.

5. The invention as defined in claim 4 further comprising:
a non-linear delay inductor having a magnetically saturable core with a substantially rectangular hysteresis characteristic for providing, initially, a high electrical inductive impedance to current flow and for providing a predetermined short delay time thereafter a low inductive impedance to current flow;
electrical resistor means having a low electrical resistance characteristic;
said resistor means being connected electrically in parallel with said non-linear delay inductor to form an inductor-resistor network;
and circuit means connecting said inductor-resistor network electrically in series between said primary winding means of said transformer means and said inverter switch means output.

6. The invention as defined in claim 3 further comprising:
a plurality of pairs of series connected capacitors, said plurality of pairs corresponding in number to said plurality of capacitors of said summing means, means connecting each respective pair of series connected capacitors across a corresponding one of said summing capacitors; and means placing each respective series juncture of said series connected pairs of capacitors electrically in common with the corresponding juncture of each half winding of the particular secondary winding of said transformer associated with said corresponding capacitor of said summing means.

7. An inverter-rectifier circuit comprising:
inverter switch means for converting a direct voltage applied to an input to a series of pulses at an output;
transformer means, said transformer means comprising a core of magnetic material defining a closed magnetic path surrounding a window opening, said core including at least first and second legs in opposed position on opposite sides of said window opening;
a first coil form of windings mounted on said first core leg and a second coil form of windings mounted on said second leg, said first coil form comprising: a single layer primary winding located most immediate said core leg and a plurality of N substantially identical secondary windings each of which comprises a single layer located one atop the other and insulated electrically from one another;
said plurality of N secondary windings having their positive polarity ends facing one direction and their negative polarity ends facing another direction, with said windings being sequentially designated by its distance from the respective core leg;
said second coil form comprising: a single layer priming winding located most immediate said core and substantially identical in construction with said first primary winding;
and a second plurality of N substantially identical windings and substantially identical in construction to said first plurality and wound one atop the other in a single layer and electrically insulated from one another;
each of said N windings having their positive polarity ends facing one direction and their negative polarity ends facing another direction with said windings being sequentially designated by its distance from the respective core leg; said windings of said first plurality corresponding to said windings of said second plurality with the same sequential designation;
electrical circuit means connecting said first and second primary windings electrically in parallel across said inverter switch means output;
a plurality of individual electrical lead means for connecting each respective positive polarity end of said second plurality of N windings to a negative polarity end of a respective corresponding one of said first plurality of N windings to place each pair of windings in series additive phase;
a plurality of N bridge rectifier means each having an input and output;
electrical circuit means for connecting each respective one of said bridge rectifier means input in circuit between the negative polarity end and the positive polarity end of a corresponding one of series connected pair of secondary windings;
and summing circuit means for connecting the outputs of each of said bridge rectifier means in series for summing up in additive polarity the individual output voltages thereof;
said circuit means comprising: a first plurality of N capacitors, corresponding to said N bridge rectifying means, said capacitors connected electrically in series.

8. The invention as defined in claim 7 further comprising:
a plurality of N pairs of series connected capacitor means, said means electrically connecting each respective pair of series connected capacitors across a corresponding one of said first plurality of N capacitors; and a plurality of electrical circuit means for individually placing each respective juncture of each said pair of series connected capacitor means electrically in common with a corresponding one of said electrical lead means of a corresponding one of said secondary windings, which secondary winding corresponds to said one of said bridge rectifier means and one of said first capacitor means across which said respective capacitor pair is connected.

9. The invention as defined in claim 8 further comprising:
a plurality of N pairs of inductors, each pair of which is associated with a corresponding one of said plurality of bridge rectifiers;
means connecting a first one of each said pairs of inductors electrically in series circuit with one output terminal of said corresponding bridge rectifier and means connecting a second one of each said pairs of inductors electrically in series with the other output terminal of said corresponding bridge rectifier circuit.

10. The invention as defined in claim 7 further comprising:
a non-linear delay inductor having a magnetically saturable core with a substantially rectangular hysteresis characteristic for providing, initially, a high electrical inductive impedance to current flow and for providing a predetermined short delay time thereafter a low inductive impedance to current flow;
electrical resistor means having a low electrical resistance characteristic;
said resistor means being connected electrically in parallel with said non-linear delay inductor to form an inductor-resistor network;
and circuit means connecting said inductor-resistor network electrically in series with said inverter switch means output.

11. The invention as defined in claim 7 wherein:
each of said N bridge rectifier means includes a positive polarity output terminal and a negative polarity output terminal,
and wherein said plurality of N series connected capacitors of said summing means includes a plurality of N + 1 capacitor input terminals, consecutively designated, which comprises a first terminal in circuit with a first one of said N capacitors and a (N + 1)$^{st}$ terminal in circuit with the Nth one of said capacitors at the ends of said series connection, and a remaining plurality of N − 1 individual terminals in circuit with each series connection juncture of said N capacitors, and further comprising:
a multisection inductor comprising:
a core of magnetic material to provide a magnetic flux path,
said core including a first air gap and a second air gap substantially identical to said first located at two space locations along said core to provide a high magnetic reluctance in said flux path;
a first coil form located on said core over said first air gap, said coil form comprising a plurality of N individual substantially identical single layer windings one atop the other and electrically isolated from one another with the positive polarity ends of each winding facing in one direction and the negative polarity ends of said windings facing the opposite direction, with the first numbered one of said plurality of windings located most proximate said core sequentially numbered to said Nth numbered one of said windings comprising the outermost winding most remote from said core;
a second coil form located on said core over said second air gap, said second coil form comprising a second plurality of N individual substantially identical single layer windings one atop the other and electrically isolated from one another with the positive polarity ends of said windings facing one direction and the negative polarity ends of said windings facing the opposite direction, with the first numbered one of said second plurality of windings located most proximate said core sequentially numbered to said Nth numbered one of said second plurality of windings comprising the outermost winding most remote from said core,
each of said N individual windings in said first coil form being substantially identical with each of the N individual windings of said second coil form;
a first plurality of N − 1 individual first electrical conductor means, each respective one of said plurality of first electrical conductor means for connecting together electrically in common a corresponding one of said negative polarity end of one of said windings on said first coil form and a corresponding positive polarity end on one of said windings in said second coil form, said positive and negative polarity ends of said second coil form and first coil form corresponding as follows:

| Conductor Means | Positive Polarity End of Windings of Second Coil Form | Corresponding Negative Polarity End of Windings of First Coil Form |
|---|---|---|
| ... | None corresponding | Winding No. 1 |
| 1$^{st}$ | Winding No. 1 | Winding No. 2 |
| ... | ... | ... |
| (N−1)$^{st}$ | Winding No. N−1 | Winding No. N |
| | Winding No. N | None corresponding | means connecting each respective one of said positive polarity ends of said first through N inductors of said first coil form in series circuit with said positive polarity output of a corresponding one of said first through N bridge rectifier means;
means connecting each respective one of said negative polarity ends of said first through N inductors of said second coil form in series circuit with said negative polarity output terminal of a corresponding one of said first through N bridge rectifier means;
means connecting the negative polarity end of said first winding of said first coil form to said first capacitor input terminal;
means connecting the positive polarity end of said Nth winding of said second coil form in circuit with said (N + 1)$^{st}$ capacitor terminal;
and means connecting each of said N − 1 remaining capacitor terminals in circuit with a corresponding one of said first plurality of N − 1 individual first electrical conductor means.

12. The invention as defined in claim 9 further comprising:
a non-linear delay inductor having a magnetically saturable core with a substantially rectangular hysteresis characteristic for providing, initially, a high electrical inductive impedance to current flow and for providing a predetermined short delay time thereafter a low inductive impedance to current flow;
electrical resistor means having a low electrical resistance characteristic;
said resistor means being connected electrically in parallel with said non-linear delay inductor to form an inductor-resistor network;

and circuit means connecting said inductor-resistor network electrically in series with said inverter switch means output.

13. The invention as defined in claim 11 further comprising:
a non-linear delay inductor having a magnetically saturable core with a substantially rectangular hysteresis characteristic for providing, initially, a high electrical inductive impedance to current flow and for providing a predetermined short delay time thereafter a low inductive impedance to current flow;
electrical resistor means having a low electrical resistance characteristic;
said resistor means being connected electrically in parallel with said non-linear dealy inductor to form an inductor-resistor network;
and circuit means connecting said inductor-resistor network electrically in series with said inverter switch means output.

14. An inverter-rectifier circuit comprising:
inverter switch means for converting a direct voltage applied to an input to a series of pulses at an output;
transformer means, said transformer means including:
a core of magnetic material defining a closed magnetic path surrounding a window opening, said core including at least first and second legs in opposed position on opposite sides of said window opening;
a first primary winding located on said first core leg and a second primary winding located on said second core leg;
means connecting said first and second primary winding in parallel across the output of said inverter switch means;
a plurality of substantially identical secondary output windings;
a like plurality of bridge rectifier means;
a like plurality of substantially identical first capacitor means;
each said bridge rectifier means having its input connected to the output of a corresponding one of said secondary windings and having its output connected across a corresponding one of said capacitors for rectifying voltages supplied to said respective rectifier input by said corresponding secondary winding and via said rectifier output charging said corresponding first capacitor means;
circuit means electrically connecting said capacitors in electrical series circuit for summing the plurality of individual voltages;
and wherein each of said secondary windings comprise first and second winding portions substantially identical to one another connected together in additive phase portion and each portion of which forms a single layer coil, said first portion of each said winding located on said first core leg and said second portion of each said winding located on said second core leg, and with each succeeding one of said plurality of secondary windings being wound over and oriented in phase with the preceding one of said secondary windings on said respective first and second core legs.

15. The invention as defined in claim 14 further comprising:
a plurality of pairs of series-connected capacitor means, each pair being connected across a corresponding one of said first capacitors, and means electrically connecting in common the juncture of each pair of series-connected capacitors with the juncture between said first and second portions of the corresponding secondary winding associated with said first capacitor.

16. A multisection inductor comprising:
a core of magnetic material to provide a magnetic flux path,
said core including a first air gap and a second air gap substantially identical to said first located at two spaced locations along said core to provide a high magnetic reluctance in said flux path;
a first coil form located on said core over said first air gap, said coil form comprising a plurality of N individual substantially identical single layer windings one atop the other and electrically isolated from one another with the positive polarity ends of each winding facing in one direction and the negative polarity ends of said windings facing the opposite direction, with the first numbered one of said plurality of windings located most proximate said core sequentially numbered to said Nth numbered one of said windings comprising the outermost winding most remote from said core;
a second coil form located on said core over said second air gap, said second coil form comprising a second plurality of N individual substantially identical single layer windings one atop the other and electrically isolated from one another with the positive polarity ends of said windings facing one direction and the negative polarity ends of said winding facing the opposite direction, with the first numbered one of said second plurality of windings located most proximate said core sequentially numbered to said Nth numbered one of said second plurality of windings comprising the outermost winding most remote from said core,
each of said N individual windings in said first coil form being substantially identical with each of the N individual windings of said second coil form;
said plurality, N, comprising an integer whole number equal to or greater than 2;
a first plurality of N−1 individual first electrical conductor means, each respective one of said plurality of first electrical conductor means for connecting together electrically in common a corresponding one of said negative polarity end of one of said windings on said first coil form and a corresponding positive polarity end on one of said windings in said second coil form, said positive and negative polarity ends of said second coil form and first coil form corresponding as follows:

| Positive Polarity End of Windings of Second Coil Form | Corresponding Negative Polarity End of Windings of First Coil Form |
|---|---|
| None corresponding | Winding No. 1 |
| Winding No. 1 | Winding No. 2 |
| ... | ... |
| Winding No. N−1 | Winding No. N |
| Winding No. N | None corresponding |

17. The invention as defined in claim 16 further comprising:
a second plurality of N electrical conductors, each respective one of said conductors being individually connected to a corresponding one of the positive polarity ends of each of said N windings in said first coil form;

a third plurality of N individual electrical conductors, each respective one of said conductors being connected to a corresponding one of said negative polarity ends of N windings in said second coil form;

a fourth plurality of (N−1) electrical conductor individually, each respective one of said conductors being connected electrically in common with a corresponding one of said first plurality of electrical conductor means;

an additional individual electrical conductor means connected to the negative polarity end of said first winding of said first coil form;

an individual electrical conductor means connected to the positive polarity end of said Nth winding of said second coil form; and electrical conductor means connected to the negative polarity end of said first winding of said first coil form.

18. The invention as defined in claim 17 wherein N equals 4.

19. The invention as defined in claim 16 wherein said core comprises a rectangular O-shaped geometry having two sets of opposed legs and wherein said first air gap is located centered in one leg of said core and wherein said second air gap is located in an opposed leg of said core.

* * * * *